United States Patent
Mechtersheimer

(12) 
(10) Patent No.: US 6,299,827 B1
(45) Date of Patent: *Oct. 9, 2001

(54) APPARATUS FOR VITRIFYING HEAVY-METAL-CONTAINING RESIDUES HAVING A CHLORINE CONTENT ABOVE 10% BY MASS

(75) Inventor: Günter Mechtersheimer, Brugg (CH)

(73) Assignee: ABB Alstom Power (Switzerland) Ltd, Baden (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,628

(22) Filed: Aug. 19, 1999

Related U.S. Application Data

(62) Division of application No. 09/087,955, filed on Jun. 1, 1998.

(30) Foreign Application Priority Data

Jun. 5, 1997 (DE) .............................................. 197 23 599

(51) Int. Cl.[7] ..................................................... C21B 3/04

(52) U.S. Cl. ........................... 266/231; 266/227; 266/200

(58) Field of Search .................................... 266/227, 229, 266/228, 231, 200; 373/8, 9, 32, 35, 41

(56) References Cited

U.S. PATENT DOCUMENTS

| | | | |
|---|---|---|---|
| 5,301,620 | 4/1994 | Nagel et al. | |
| 5,490,869 | * 2/1996 | D'Obrenan et al. | 75/10.14 |
| 5,574,746 | * 11/1996 | Ammon et al. | 373/9 |
| 5,926,498 | * 7/1999 | Mechtersheimer | 373/9 |

FOREIGN PATENT DOCUMENTS

| | | |
|---|---|---|
| 3841889A1 | 3/1990 | (DE) . |
| 3841918C | 4/1990 | (DE) . |
| 3904613A1 | 9/1990 | (DE) . |
| 9206502 U | 10/1992 | (DE) . |
| 4340754 | 6/1995 | (DE) . |
| 4340754A1 | 6/1995 | (DE) . |
| 4446575C2 | 6/1996 | (DE) . |
| 19603365A | 8/1997 | (DE) . |
| 0313902A1 | 5/1989 | (EP) . |
| 373557A | 6/1990 | (EP) . |
| 0417520A | 3/1991 | (EP) . |
| 0633441 A1 | * 4/1994 | (EP) . |
| 0610576A1 | 8/1994 | (EP) . |
| 0611609A1 | 8/1994 | (EP) . |
| 0633441A | 1/1995 | (EP) . |
| 0633441A1 | 1/1995 | (EP) . |
| 0718242A2 | 6/1996 | (EP) . |
| 0820962a | 1/1998 | (EP) . |
| 2370002A | 6/1978 | (FR) . |

OTHER PUBLICATIONS

J. Iori et al., "Detoxification of Municipal Waste Incineration Residues by Vitrification", ABB Review, dated Jan. 1, 1995.

* cited by examiner

*Primary Examiner*—Scott Kastler
(74) *Attorney, Agent, or Firm*—Burns, Doane, Swecker & Mathis, L.L.P.

(57) ABSTRACT

An apparatus for vitrifying heavy-metal-containing residues having a chlorine content above 10% by mass, in particular from flue gas cleaning, which are melted in a melting furnace, the constituents which cannot be incorporated into the melt are separated in the main furnace into two fractions, the first fraction comprising the readily volatile components and the second fraction comprising the salt-like less volatile components, and the first fraction is evaporated off, conducted out of the furnace together with the exhaust gas and collected as condensate, and the second fraction is separated from the surface of the melt as liquid salt and is discharged.

5 Claims, 1 Drawing Sheet

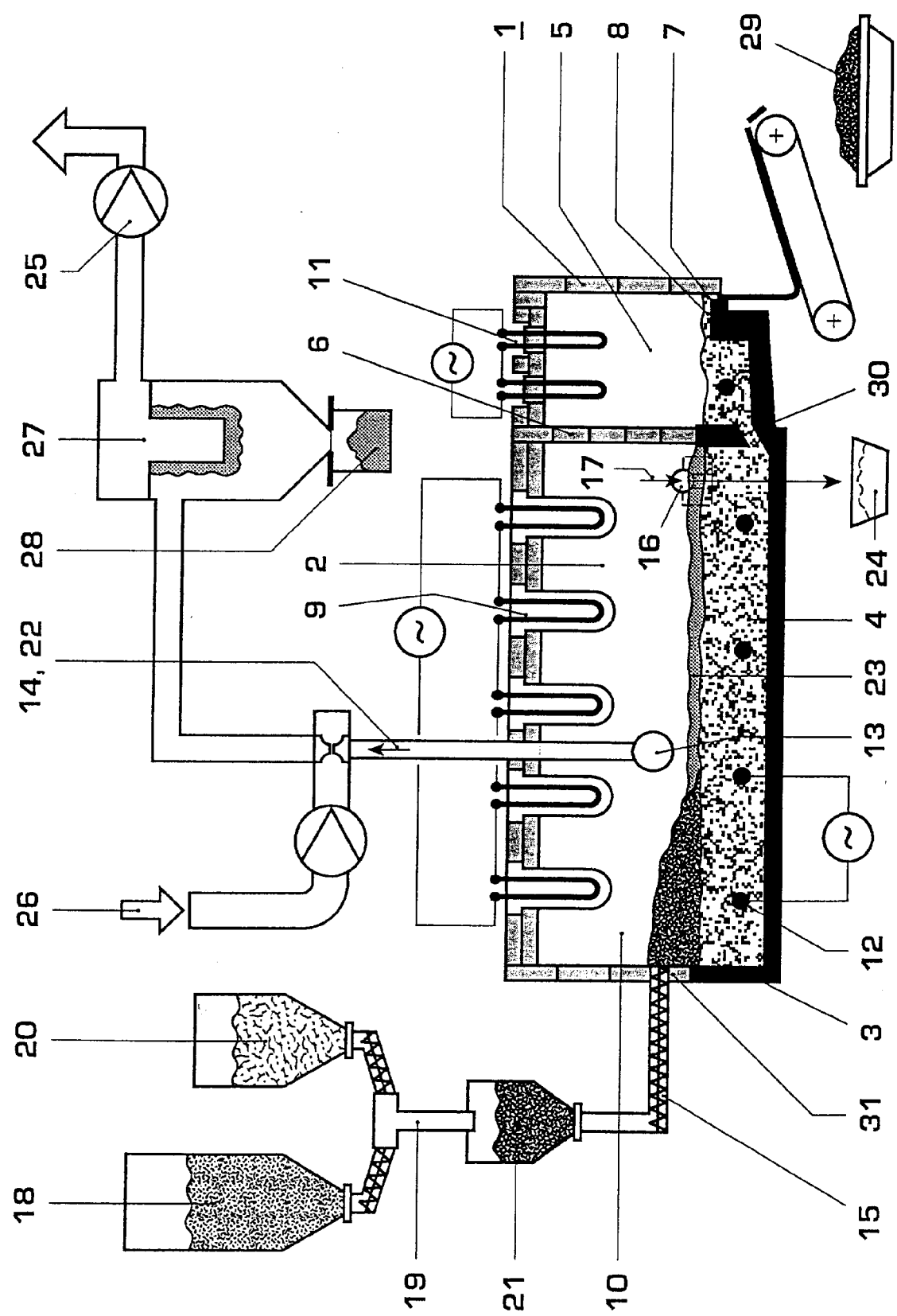

under the influence of gravity. The advantages of the invention are, inter alia, that the condensate is so highly enriched with heavy metals that treatment for heavy metal recovery is worthwhile. In com-

APPARATUS FOR VITRIFYING HEAVY-METAL-CONTAINING RESIDUES HAVING A CHLORINE CONTENT ABOVE 10% BY MASS

This application is a divisional of application Ser. No. 09/087,955, filed Jun. 1, 1998.

BACKGROUND OF THE INVENTION

1. Field of the Invention

The invention relates to a process for vitrifying heavy-metal-containing residues having a chlorine content above 10% by mass from flue gas cleaning, in particular filter dust and residues from flue gas scrubbing. In the process, the residues are melted in a melting furnace and are then discharged, with fluxes being able to be added to condition the melt. The invention also relates to a melting furnace for carrying out the process. A process of this generic type is disclosed by DE 43 40 754 A1, for example, and a Deglor furnace is described, for example, in EP 0 633 411 A1.

2. Discussion of Background

It is known to treat heavy-metal-containing residues, such as filter ash from the incineration of refuse, by melt processes. At temperatures of approximately from 1300 to 1400° C., these residues are generally melted without fluxes in an electrical melting furnace, discharged from the furnace and then cooled, so that a vitreous residue is formed which can be landfilled without problem.

In the Deglor process, heating above the melt as well ensures that, on account of sufficiently high temperatures in the gas space, a considerable proportion of the heavy metals is evaporated. The exhaust gas taken off from the furnace by a fan is cooled and passed through a bag filter, in which the heavy metals which have condensed out are collected as condensate. This condensate can be treated in a metal works to recover the heavy metals. The molten residues are discharged from the furnace via a gas-tight siphon and then cooled, in which case a vitreous product is formed. The heavy metal evaporation contributes to the fact that the quality of the glass product permits reusability. This makes up a considerable advantage of the Deglor process in comparison with other known melting processes in which, because of the lack of heating in the upper furnace, there is no evaporation of the heavy metals.

The Deglor process has proved most useful in the vitrification of, residues having a comparatively low content of metal chlorides, metal sulfates and metal sulfites, as are typically present in filter dust.

However, residues also arise in which the filter ash is admixed with the flue gas cleaning product which has a high chlorine content. Thus, to remove sulfur dioxide and hydrochloric acid, the exhaust gases are subjected to a lime scrubbing, calcium compounds, in particular $CaSO_3$, $CaSO_4$ and $CaCl_2$, arising as byproducts which are to be melted and vitrified together with the filter ash. Typically, this product comprises from 10 to 20% by mass of chlorine, predominantly in the form of $CaCl_2$. This compound has a boiling point (>1600° C.) far above the customary operating temperatures. This means that these chlorides cannot be transferred to the vapor phase effectively enough. At the same time, only a small portion of chlorine can be incorporated into the glass.

In order to be able to melt this residue with a high salt content likewise in an environmentally compatible manner, the applicant has suggested a process in which an alkaline flux in the form of an oxide, hydroxide or carbonate is added to the residues, after mixing the stoichiometric ratio between the sum of the alkalines and the chlorine being greater than 0.75, preferably greater than 1 (DE 196 03 365.9). The admixture of suitable alkali-metal-containing additives and the assurance of a sufficiently high exhaust gas volume significantly increases the evaporation rate of the chlorides.

Since the chlorides predominantly evaporate as NaCl, disadvantageously, a considerably greater amount of condensate is produced in which the heavy metals are then present in a form so dilute that treatment is no longer worthwhile.

A further disadvantage is that on account of the additives additionally required, the additional rate of exhaust gas and the greater quantity of material to be evaporated off, the energy requirement of the Deglor unit increases.

The two last-mentioned disadvantages are also present if, instead of lime, alkali-metal-containing reagents, such as $NaHCO_3$, for example, are used for the flue gas cleaning, as a result of which the addition of alkali-metal-containing fluxes to the melting furnace is no longer necessary to increase the evaporation rate.

SUMMARY OF THE INVENTION

The invention attempts to avoid all these disadvantages. Accordingly, one object of the invention is to provide a process and an apparatus for vitrifying heavy-metal-containing residues having a high chlorine content from flue gas cleaning of the abovementioned type, in which the amount of the required alkali-metal-containing additives is reduced, and the throughput of residues can be increased. Furthermore, the electrical power required and the exhaust gas rate are to be reduced, so that, overall, lower operating costs arise. In addition, a more economical recovery of heavy metals from the condensate is to be made possible.

According to the invention this is achieved, in a process, wherein heavy-metal-containing residues are melted in a melting furnace which includes a main furnace and a discharge furnace by separating, in the main furnace, the components of the residues which cannot be incorporated into the melt into two fractions, the first fraction comprising the readily volatile components and the second fraction comprising the salt-like less volatile components, and the first fraction is evaporated off, conducted out of the furnace together with the exhaust gas and collected as condensate, and the second fraction is separated from the surface of the melt as a liquid salt and is discharged.

The invention is based on the unexpected finding that, in the operation of the melt plant as described in DE 196 03 365.9, on the surface of the vitreous melt a stable mobile salt layer can develop, which consists virtually exclusively of $CaCl_2$, NaCl and KCl and comprises, in particular, a heavy metal concentration which is lower, compared with the condensate. According to the invention, all of the salt no longer is evaporated off together with the other volatile constituents of the residue.

According to the invention this is achieved in a melting furnace wherein by a lateral outlet for the salt floating on the glass melt is provided in the outer wall of the main furnace. The lower edge of this lateral orifice is arranged at a height of approximately from 1 to 10 cm above the melt level determined by the outlet block.

The advantages of the invention are, inter alia, that the condensate is so highly enriched with heavy metals that treatment for heavy metal recovery is worthwhile. In comparison with the prior art, in addition, the amount of alkalimetal-containing fluxes can be reduced, and the furnace temperature can be decreased, so that, firstly, the service life of the furnace parts is increased, and, secondly, the electrical power required can be reduced. There is a significant increase in the throughput of residue, so that overall the operating costs of the plant can be decreased.

It is particularly expedient if a mass ratio between the first fraction, that is the condensate, and the second fraction, that is the liquid salt, is set which is in the range from 0.1 to 10, depending on the composition of the residue. The size of the mass ratio between the first and second fractions is set by the choice of the process parameters, preferably temperature, exhaust gas rate and amount of alkali-metal-containing additives. It is important that the evaporation of the salt, that is of the second fraction, is restricted. This occurs, for example, by the amount of exhaust gas and/or the temperature above the melt of the amount of alkali-metal-containing additives are reduced.

Finally, advantageously, a thickness greater than 1 cm, preferably from 3 to 10 cm, is set for the second fraction situated on the surface of the melt in the main furnace. This ensures a clean separation of the salt layer from the glass melt situated beneath. In this case, layer thicknesses in the upper range are advantageous if the residues are fed into the melting furnace at high transport rates.

It is further expedient if the air additionally introduced into the main furnace to control the exhaust gas rate from the furnace is preheated, prior to entry into the main furnace, by the liquid salt flowing out of the main furnace. The exhaust gas rate from the furnace is set by the feed air rate and thus the proportion of components evaporated off is determined in conjunction.

Furthermore, it is advantageous, if, in the melting furnace, the orifice for the salt discharge is arranged in the vicinity of the partition between the main furnace and discharge furnace. This prevents the discharged salt being contaminated by unmolten residue.

Finally, it is advantageous if the orifice for the salt discharge is simultaneously provided for adding feed air, because thus, in a simple manner, the hot effluent salt can be used for preheating the feed air.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein an illustrative example of the invention is presented on the basis of a Deglor furnace for a refuse incineration plant.

The drawings shows a diagrammatic representation of the furnace and the units connected upstream and downstream.

Only elements which are essential for understanding the invention are shown.

DESCRIPTION OF THE PREFERRED EMBODIMENTS

Referring now to the drawing, the invention is described in more detail below with reference to an illustrative example and the drawings.

The FIGURE shows diagrammatically a melting furnace 1 which consists of a main furnace 2 having a melting bath 3 situated in the lower part for receiving the melt 4, and a discharge furnace 5. The discharge furnace 5 is connected via a siphon 30 to the melting bath 3 and is separated from the main furnace 2 by a partition 6. At the wall of the discharge furnace 5 opposite the siphon 30, an overflow is arranged as a discharge apparatus 7 having an outlet block 8 for the discharge of the glass melt 4. A first heating apparatus in the form of electrical heating elements 9 which are surrounded by ceramic protective tubes extends from the top into the gas space 10 of the main furnace 2, without dipping into the melt 4. A second heating apparatus in the form of electrical heating elements 11 likewise extends from the top into the discharge furnace 5, without touching the melt 4. In the area upstream, in and downstream of the siphon 30, third heating elements in the form of bath electrodes 12 are provided which are always covered by the melt 4 and also ensure that passage through the siphon 30 does not become blocked during the operation of the melting furnace 1. In the main furnace 2, in addition, a take-off apparatus 13 is provided for the exhaust gas 14. To introduce the residues to be treated into the main furnace 2, an inlet 31 is arranged in the end wall of the main furnace 2, which inlet is situated above the level of the melt 4. The feed is performed using a charging apparatus 15, for example a screw conveyor.

A melting furnace of this type is the subject-matter of EP 0 633 441 A1.

According to the invention, a lateral orifice 16 is arranged in the outer wall of the main furnace 2, which lateral orifice is provided for a salt discharge which is still to be described. The lower side of the orifice 16 is situated at a height of approximately from 1 to 10 cm above the level of the melt surface which forms during operation of the furnace without a salt layer. This melt surface is approximately at the height of the outlet block 8. The orifice 16 can, in addition to the salt discharge, simultaneously be used for the addition of feed air 17.

Heavy-metal-containing residues 18 from flue gas cleaning of refuse incineration plants typically having from 10 to 20% by mass or even still higher contents of chlorine, such as filter ash, are mixed in a mixer 19 with fluxes 20 in the form of an oxide, hydroxide or carbonate and are then stored temporarily in an intermediate silo 21. By means of a charging apparatus 15, the mixture is introduced into the main furnace 2 of the melting furnace 1 and melted.

The additives are essentially required to produce from the residue 18 an easily meltable and stable glass. Since, using the invention, all chlorine-containing constituents of the residues no longer need to be evaporated off, the alkali-metal-containing fluxes as specified in DE 196 03 365.9 are no longer necessary, or can be used in a considerably smaller dosage.

By selecting the process parameters, in particular temperature, exhaust gas rate and amount of alkali-metal-containing additives, the amount of volatile components which are evaporated off and collected as condensate, in particular heavy metal chlorides (first fraction 22), and the content of salt-like components which are separated from the melt 4 as liquid salt 23 (second fraction) and are discharged through the orifice 16 either continuously or batch-wise and collected in a vessel 24, can be set. The second fraction 23 comprises the less volatile components, in particular $CaCl_2$, NaCl and KCl.

The melt 4 is taken off continuously or intermittently from the discharge furnace 5 and, as vitreous product 29, is landfilled or further processed.

The exhaust gases 14 of the melting furnace, including the first fraction 22 which is evaporated off, are drawn out of the melting furnace by a fan 25 and cooled (quenched) with cold air 26. As a result, the heavy metal compounds condense and desublimate from the gas and can be separated off as condensate 28 in a downstream filter, e.g. bag filter 27, and further processed later. The filtered air can be recirculated, for example, to the refuse incineration plant.

On account of the differing evaporation characteristics between the two fractions 22 and 23, there is a separation of the generally more readily volatile heavy metals, such as Pb, which pass into the condensate 28, from the predominantly less volatile NaCl, KCl and $CaCl_2$ which are to be discharged as salt. The condensate 28 is then so highly enriched with heavy metals that work-up for heavy metal recovery is worthwhile again.

Depending on composition of the residue 18, the mass ratio of condensate 28 and liquid salt 23 should be between 0.1 and 10.

It is of importance that the evaporation of the salt is limited, so that the thickness of the salt layer 23 would increase with time without further measures with continuous transport of the residue 18. This can be achieved by reducing the exhaust gas rate and/or the temperature above the melt or by reducing the amount of alkali-metal-containing additives. However, it is of importance here that the temperature in the furnace remains high enough in order on the one hand to prevent unmelted starting materials from covering the surface near the orifice 16 on account of an insufficient melting rate, and on the other hand to guarantee sufficient evaporation of the heavy metals. For this purpose, temperatures above 1200° C. are necessary. Therefore, heating in the upper furnace is unavoidable.

Continuous or batchwise discharge of liquid salt then ensures that the thickness of the salt layer 23 remains constant on average over time with continuous transport of the residues 18. The thickness of the salt layer 23 should be greater than 1 cm in order to ensure clean separation from the underlying glass melt 4. Preferably, layer thicknesses between 3 and 10 cm should be sought after. Higher values are advantageous, in particular, if the residues 18 are fed into the melting furnace 1 at high transport rates.

On account of the low melting point and the low viscosity, the molten salt 23 very effectively flows round the residue 18 introduced. This increases the heat transfer and ensures that the residue 18 which is introduced melts more rapidly. This avoids a pile of still unmelted residue 18 from forming at high transport rates, which pile, on contact, would destroy the heating elements 9 in the upper furnace.

If the salt layer 23 builds up on the surface of the glass melt 4, the melt surface ascends in the main furnace 2 on account of the lower density compared with the glass melt. The lateral orifice 16 then forms an overflow for the salt 23 floating on the surface of the melt 4, which salt 23 can be collected in a laterally mounted vessel 24. In this manner, continuous operation of the plant is possible. In order that the discharged salt is not contaminated by unmelted residues 18, it is expedient to arrange the orifice 16 for the salt discharge in the vicinity of the partition 6 between the main furnace 2 and the discharge furnace 5.

The orifice 16 can simultaneously be used for adding feed air 17 to the main furnace. The rate of exhaust gas 14 from the furnace is set by the rate of feed air 17 and thus the amount of components evaporated is conjointly determined. It is expedient if the hot salt 23 flowing out of the orifice 16 is used to preheat the feed air 17.

When a Deglor plant is operated with a typical residue which consists of a mixture of filter ash and product of the dry flue gas cleaning of a refuse incineration plant, if 70% of the chlorides are discharged as liquid salt, using the process according to the invention, the advantages below can be achieved in comparison with the process disclosed by DE 196 03 365.9:

reduction of the amount of additive required by approximately 60%, significant increase in throughput of residue (at least 30%) or more compact size of the melting furnace, reduction of the electrical power required by 30%, reduction of the exhaust gas rate by 40%, decreasing furnace temperature by more than 50° C., lowering the operating costs, more economical recovery of heavy metals from the condensate.

LIST OF DESIGNATIONS

1 Melting furnace
2 Main furnace
3 Melting bath
4 Melt
5 Discharge furnace
6 Partition
7 Discharge apparatus for item 4
8 Outlet block
9 Electrical heating element having a ceramic protective tube for item 2
10 Gas space of item 2
11 Electrical heating element for item 5
12 Bath electrodes
13 Take-off apparatus for item 14
14 Exhaust gas
15 Charging apparatus
16 Orifice for salt discharge
17 Feed air
18 Residues
19 Mixer
20 Fluxes
21 Intermediate silo
22 First fraction (volatile components)
23 Second fraction (liquid salt)
24 Vessel for item 23
25 Fan
26 Cold air
27 Filter
28 Condensate
29 Glass
30 Siphon
31 Inlet into item 2

What is claimed as new and desired to be secured by Letters Patent of the United States is:

1. A melting furnace useful for vitrifying heavy-metal-containing residues having a chlorine content above 10% by mass, comprising a main furnace having a melting bath to receive a melt, at least one charging apparatus for feeding residues to be treated and fluxes, at least one discharge furnace spatially separated from the charging apparatus, which discharge furnace is connected via a siphon to the melting bath and is separated from the main furnace by a partition, at least one first heating apparatus protruding into the main furnace, at least one second heating apparatus protruding into the discharge furnace, at least one third heating apparatus arranged in the melt in the main furnace and in the discharge furnace in the form of bath electrodes, at least one take-off apparatus for the exhaust gas, and at least one discharge apparatus arranged in the discharge furnace having an outlet block, wherein a lateral orifice is provided in the outer wall of the main furnace for a salt discharge having a low content of heavy metals, the lower edge of which orifice is arranged at a height of approximately from 1 to 10 cm above the melt level determined by the outlet block.

2. The melting furnace as claimed in claim 1, wherein the orifice is located between the main furnace and the discharge furnace.

3. The melting furnace as claimed in claim 1, wherein the salt discharge includes means for adding feed air.

4. The apparatus as claimed in claim 1, further comprising means for combining alkali-metal-containing additives and heavy-metal-containing residues into a mixture and supplying the mixture to the main furnace at a position above the melt.

5. The apparatus as claimed in claim 1, further comprising means for removing a condensate comprising heavy metals from the exhaust gas, the condensate having a heavy metal concentration which is greater than the heavy metal concentration of the salt discharge.

* * * * *